United States Patent
Nagae

(10) Patent No.: US 8,006,494 B2
(45) Date of Patent: Aug. 30, 2011

(54) EXHAUST GAS RECIRCULATION APPARATUS FOR INTERNAL COMBUSTION ENGINE AND METHOD OF CONTROLLING EXHAUST GAS RECIRCULATION APPARATUS

(75) Inventor: Masahiro Nagae, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 247 days.

(21) Appl. No.: 11/996,132

(22) PCT Filed: Apr. 20, 2007

(86) PCT No.: PCT/IB2007/001019
§ 371 (c)(1),
(2), (4) Date: Jan. 18, 2008

(87) PCT Pub. No.: WO2007/129160
PCT Pub. Date: Nov. 15, 2007

(65) Prior Publication Data
US 2009/0038308 A1 Feb. 12, 2009

(30) Foreign Application Priority Data
Apr. 26, 2006 (JP) ................................. 2006-121674

(51) Int. Cl.
F02B 33/44 (2006.01)
F02B 37/22 (2006.01)
F02B 17/00 (2006.01)
F02M 25/07 (2006.01)

(52) U.S. Cl. ........ 60/605.2; 701/108; 701/103; 123/295

(58) Field of Classification Search ................ 60/605.2; 123/295; 701/103, 108; F02B 37/22; F02M 25/07; F02D 41/00, 41/12
See application file for complete search history.

(56) References Cited

U.S. PATENT DOCUMENTS
6,240,721 B1 * 6/2001 Ito et al. ........................ 123/295
(Continued)

FOREIGN PATENT DOCUMENTS
EP 1 004 760 A2 5/2000
(Continued)

OTHER PUBLICATIONS

Machine Translation of JP 2000-145512 A, published on May 26, 2005.*

(Continued)

Primary Examiner — Thai Ba Trieu
(74) Attorney, Agent, or Firm — Sughrue Mion, PLLC

(57) ABSTRACT

A variable-geometry turbocharger and a low-pressure EGR passage are provided. The variable-geometry turbocharger includes a turbine provided in an exhaust passage, and a compressor provided in an intake passage. In the variable-geometry turbocharger, the cross sectional area of a path through which exhaust gas passes is adjusted by adjusting the opening degree of a nozzle vane. The low-pressure EGR passage connects the area of the exhaust passage downstream of the turbine to the area of the intake passage upstream of the compressor. The EGR gas is recirculated to the intake passage through the low-pressure EGR passage. The EGR gas is directed to flow through the low-pressure EGR passage when a vehicle is decelerating or when fuel supply to the internal combustion engine is cut off. The pressure in the intake passage is adjusted toward a target pressure by adjusting the opening degree of the nozzle vane when the EGR gas flows through the low-pressure EGR passage.

23 Claims, 3 Drawing Sheets

U.S. PATENT DOCUMENTS

| | | | |
|---|---|---|---|
| 6,301,888 B1 * | 10/2001 | Gray, Jr. | 60/605.2 |
| 6,470,682 B2 * | 10/2002 | Gray, Jr. | 60/605.2 |
| 6,651,432 B1 * | 11/2003 | Gray, Jr. | 60/605.2 |
| 7,025,042 B2 * | 4/2006 | Gray, Jr. | 123/435 |
| 7,047,741 B2 * | 5/2006 | Gray, Jr. | 60/605.2 |
| 7,047,933 B2 * | 5/2006 | Gray, Jr. | 123/568.21 |
| 7,322,194 B2 * | 1/2008 | Sun et al. | 60/605.2 |
| 2004/0149274 A1 | 8/2004 | Kurtz et al. | 123/295 |

FOREIGN PATENT DOCUMENTS

| | | |
|---|---|---|
| EP | 1 420 159 A2 | 5/2004 |
| JP | 8-170539 A | 7/1996 |
| JP | 10-266866 A | 10/1998 |
| JP | 2000-145512 A | 5/2000 |
| JP | 2000-220462 A | 8/2000 |
| JP | 2001-82234 A | 3/2001 |
| JP | 2003-193852 A | 7/2003 |
| JP | 2004-150319 A | 5/2004 |
| JP | 2005-127247 A | 5/2005 |
| JP | 2009121433 A * | 6/2009 |

OTHER PUBLICATIONS

Machine Translation of JP 2004-150319 A, published on May 27, 2004.*

Machine Translation of JP 2003-193852 A, published on Jul. 9, 2003.*

* cited by examiner

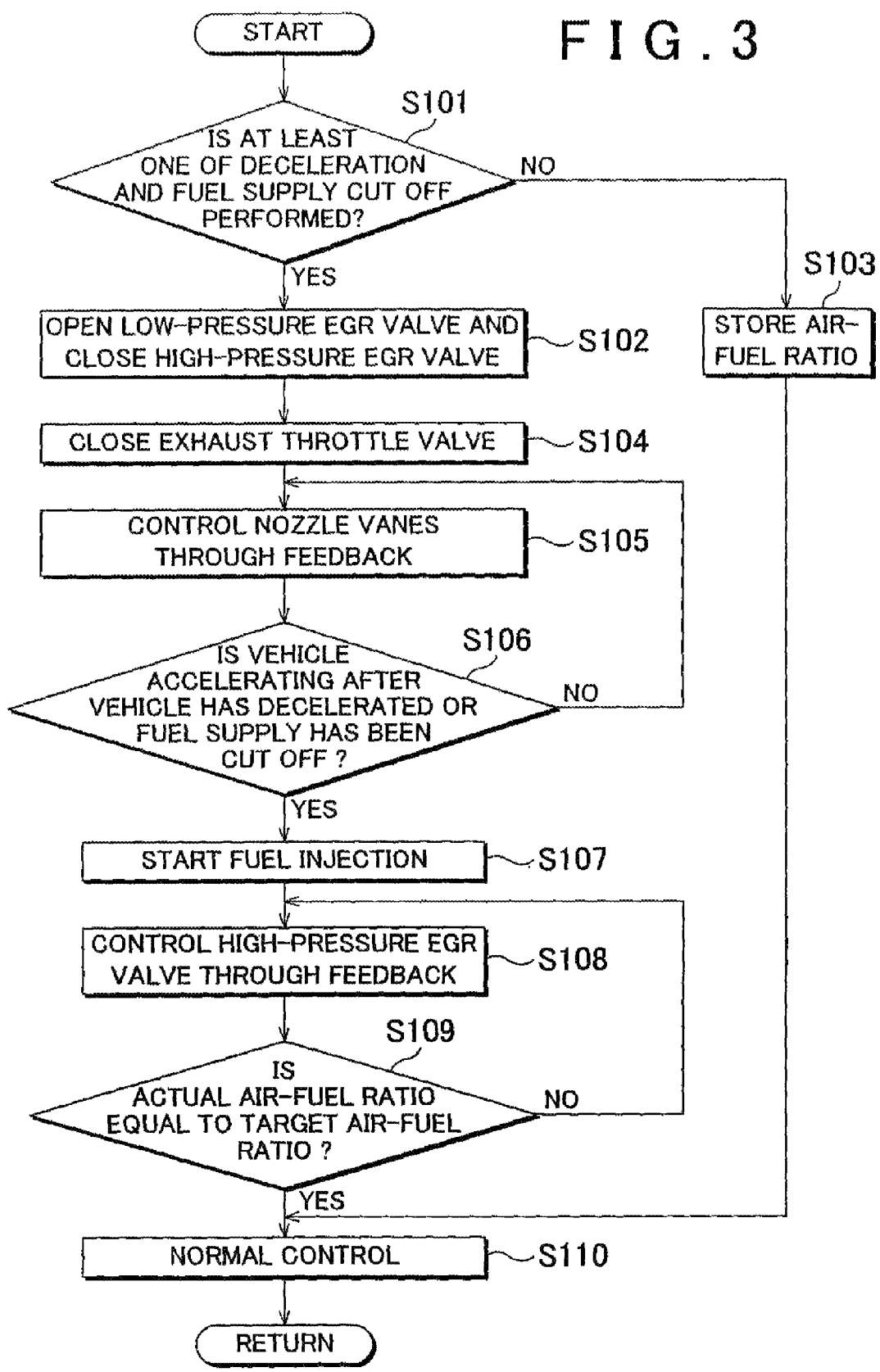

EXHAUST GAS RECIRCULATION APPARATUS FOR INTERNAL COMBUSTION ENGINE AND METHOD OF CONTROLLING EXHAUST GAS RECIRCULATION APPARATUS

BACKGROUND OF THE INVENTION

1. Field of the Invention

The invention relates to an exhaust gas recirculation apparatus for an internal combustion engine and a method of controlling the exhaust gas recirculation apparatus.

2. Description of the Related Art

An exhaust gas recirculation apparatus for an internal combustion engine is available. The exhaust gas recirculation apparatus includes a turbocharger and a low-pressure EGR passage. The turbocharger includes a turbine provided in an exhaust passage, and a compressor provided in an intake passage. The low-pressure EGR passage connects an area of the exhaust passage downstream of the turbine to an area of the intake passage upstream of the compressor. EGR gas, which is part of exhaust gas discharged from the internal combustion engine, is recirculated to the intake passage through the low-pressure EGR passage. Another exhaust gas recirculation apparatus that includes a high-pressure EGR passage is available. The high-pressure EGR passage connects the area of the exhaust passage upstream of the turbine to the area of the intake passage downstream of the compressor.

Japanese Patent Application Publication No. 2004-150319 (JP-A-2004-150319) describes that the low-pressure EGR passage or the high-pressure EGR passage is selected based on an engine speed and an engine load, and the EGR gas is supplied through the selected EGR passage.

However, when a vehicle starts accelerating after the vehicle has decelerated or fuel supply to the engine has been cut off, an air-fuel ratio may temporarily increase, and NOx may be discharged. When the fuel supply is cut off, air flows into the engine cylinders. Therefore, the air-fuel ratio of the gas in the intake pipe, cylinder, or exhaust pipe gradually increases. Accordingly, when the vehicle starts accelerating after the vehicle has decelerated or the fuel supply to the engine has been cut off, the supplied EGR gas is almost the same as the atmospheric air. Therefore, the EGR gas may not effectively suppress the generation of NOx. Thus, when the vehicle starts accelerating, NOx may be discharged.

Also, when the vehicle is decelerating or when the fuel supply to the engine is cut off, the rotational speed of the turbocharger decreases. As a result, a boost pressure may decrease. When the accelerator pedal is depressed after the boost pressure has decreased, the acceleration of the vehicle may be slow.

SUMMARY OF THE INVENTION

The invention provides an exhaust gas recirculation apparatus for an internal combustion engine and method of controlling the exhaust gas recirculation apparatus that enables a vehicle to quickly accelerate while suppressing the discharge of NOx when the vehicle starts accelerating after the vehicle has decelerated or the fuel supply to the engine has been cut off.

A first aspect of the invention relates to an exhaust gas recirculation apparatus for an internal combustion engine, which includes a variable-geometry turbocharger, a low-pressure EGR passage, deceleration-EGR means, and deceleration-supercharging means. The variable-geometry turbocharger includes a turbine provided in an exhaust passage, and a compressor provided in an intake passage. In the variable-geometry turbocharger, the cross sectional area of a path through which exhaust gas passes is adjusted by adjusting the opening degree of a nozzle vane. The low-pressure EGR passage connects an area of the exhaust passage downstream of the turbine to an area of the intake passage upstream of the compressor. EGR gas, which is part of exhaust gas discharged from an internal combustion engine, is recirculated to the intake passage through the low-pressure EGR passage. The deceleration-EGR means directs the EGR gas to flow through the low-pressure EGR passage when a vehicle is decelerating or when fuel supply to the internal combustion engine is cut off. The deceleration-supercharging means adjusts the pressure in the intake passage toward a target pressure by adjusting the opening degree of the nozzle vane when the EGR gas is directed to flow through the low-pressure EGR passage by the deceleration-EGR means.

According to the first aspect, the deceleration-EGR means directs the EGR gas to flow through the low-pressure EGR passage when the vehicle is decelerating or when the fuel supply to the internal combustion engine is cut off. Thus, the burned gas, which is discharged from the cylinder immediately before the vehicle starts decelerating or immediately before the fuel supply to the internal combustion engine is cut off, is recirculated to the intake passage. That is, the burned gas is repeatedly recirculated. As a result, the burned gas accumulates in the recirculation passage. Accordingly, when the vehicle starts accelerating, the burned gas is quickly supplied into the cylinder.

Because the deceleration-EGR means directs the EGR gas to flow through the low-pressure EGR passage, the amount of exhaust gas that passes through the turbine increases. That is, because the low-pressure EGR passage connects to an area of the exhaust passage downstream of the turbine, the EGR gas flows into the low-pressure EGR passage after having passed through the turbine. In other words, when the EGR gas flows through the low-pressure EGR passage, the EGR gas (exhaust gas) has passed through the turbine.

In the first aspect, when the deceleration-EGR means directs the EGR gas to flow through the low-pressure EGR passage, the deceleration-supercharging means may decrease the opening degree of the nozzle vane.

When the vehicle is decelerating or when the fuel supply to the internal combustion engine is cut off, energy cannot be obtained by burning fuel. Therefore, the boost pressure decreases. According to the above-described aspect, when the vehicle is decelerating or when the fuel supply to the internal combustion engine is cut off, the nozzle vane of the variable-geometry turbocharger is closed to increase the flow speed of the gas in the turbine. As a result, the rotational speed of the variable-geometry turbocharger increases. This suppresses the decrease in the boost pressure.

Because the deceleration-supercharging means adjusts the pressure in the intake passage toward the target pressure, the vehicle accelerates quickly when the accelerator pedal is depressed. The target pressure is set in advance such that the vehicle quickly accelerates when the accelerator pedal is depressed. The boost pressure may be adjusted toward the target pressure, for example, through a feedback control.

In the invention, the phrase "the vehicle is decelerating" indicates that the vehicle is decelerating because the accelerator pedal has been released and the speed of the internal combustion engine decreases. That is, in the invention, the phrase "the vehicle is decelerating" does not include the case where the vehicle is decelerating due to an increase in a load applied to the vehicle. In the invention, the phrase "the fuel supply to the internal combustion is cut off" signifies that the fuel supply is stopped, for example, by releasing the accelerator pedal when the internal combustion engine is operating.

The exhaust gas recirculation apparatus in the first aspect may further include a low-pressure EGR valve and an exhaust throttle valve. The low-pressure EGR valve adjusts the amount of EGR gas that flows through the low-pressure EGR passage. The exhaust throttle valve adjusts the amount of exhaust gas that flows through the area of the exhaust passage downstream of the position where the low-pressure EGR passage is connected to the exhaust passage. The deceleration-EGR means may direct the EGR gas to flow through the low-pressure EGR passage by making the opening degree of the low-pressure EGR valve greater than that when the low-pressure EGR valve is fully closed, and making the opening degree of the exhaust throttle valve smaller than that when the exhaust throttle valve is fully open.

In the above-described aspect, the flow rate of the EGR gas is adjusted by adjusting the opening degree of the low-pressure EGR valve. The deceleration-EGR means directs the EGR gas to flow through the low-pressure EGR passage by making the opening degree of the low-pressure EGR valve greater than that when the low-pressure EGR valve is fully closed, or by fully opening the low-pressure EGR valve. Further, the deceleration-EGR means increases the pressure in the area of the exhaust passage on the engine-side of the exhaust throttle valve (i.e., upstream of the exhaust throttle valve), by making the opening degree of the exhaust throttle valve smaller than that when the exhaust throttle valve is fully open, or by fully closing the exhaust throttle valve. This increases the difference in the pressure between the area close to the exhaust passage and the area close to the intake passage in the low-pressure EGR passage. Therefore, it is possible to increase the amount of EGR gas that flows through the low-pressure EGR passage.

The exhaust gas recirculation apparatus according to the first aspect of the invention may further include a low-pressure EGR valve and a first intake throttle valve. The low-pressure EGR valve adjusts the amount of EGR gas that flows through the low-pressure EGR passage. The first intake throttle valve adjusts the amount of intake air that flows through the area of the intake passage upstream of the position where the low-pressure EGR passage is connected to the intake passage. The deceleration-EGR means may direct the EGR gas to flow through the low-pressure EGR passage by making the opening degree of the low-pressure EGR valve greater than that when the low-pressure EGR valve is fully closed, and making the opening degree of the first intake throttle valve smaller than that when the first intake throttle valve is fully open.

In the above-described aspect, when the vehicle is decelerating or when the fuel supply to the internal combustion engine is cut of, the deceleration-time EGR means may fully close the first intake throttle valve and fully open the low-pressure EGR valve.

In the above-described aspect, the deceleration-EGR means directs the EGR gas to flow through the low-pressure EGR passage by making the opening degree of the low-pressure EGR valve greater than that when the low-pressure EGR valve is fully closed. Further, the deceleration-EGR means reduces the pressure in the area of the intake passage on the engine-side of the first intake throttle valve (i.e., downstream of the first intake throttle valve) by making the opening degree of the first intake throttle valve smaller than that when the first intake throttle valve is fully open, or by fully closing the first intake throttle valve. This increases the difference in the pressure between the area close to the exhaust passage and the area close to the intake passage in the low-pressure EGR passage. As a result, it is possible to increase the amount of EGR gas that flows through the low-pressure EGR passage.

The exhaust gas recirculation apparatus may further include an exhaust throttle valve. The exhaust throttle valve adjusts the amount of exhaust gas that flows through the area of the exhaust passage downstream of the position where the low-pressure EGR passage is connected to the exhaust passage. Thus, the deceleration-EGR means may cause the EGR gas to flow through the low-pressure EGR passage by making the opening degree of the low-pressure EGR valve greater than that when the low-pressure EGR valve is fully closed, making the opening degree of the exhaust throttle valve smaller than that when the exhaust throttle valve is fully open, and making the opening degree of the first intake throttle valve smaller than that when the first intake throttle valve is fully open.

In the above-described aspect, when the vehicle is decelerating or when the fuel supply to the internal combustion engine is cut off, the deceleration-EGR means may fully close the exhaust throttle valve and fully open the low-pressure EGR valve.

The exhaust gas recirculation apparatus according to the above-described aspect may further include a high-pressure EGR passage and a high-pressure EGR valve. The high-pressure EGR passage connects the area of the exhaust passage upstream of the turbine to the area of the intake passage downstream of the compressor. The EGR gas is recirculated to the intake passage through the high-pressure EGR passage. The high-pressure EGR valve adjusts the amount of EGR gas that flows through the high-pressure ER passage. The deceleration-EGR means make the opening degree of the high-pressure EGR valve smaller than that when the high-pressure EGR valve is fully open.

In the above-described aspect, when the vehicle is decelerating or when the fuel supply to the internal combustion engine is cut off, the deceleration-EGR means may fully close the high-pressure EGR valve.

In the above-described aspect, the flow rate of EGR gas is adjusted by adjusting the opening degree of the high-pressure EGR valve. The deceleration-EGR means suppresses the flow of EGR gas into the high-pressure EGR passage by making the opening degree of the high-pressure EGR valve smaller than that when the high-pressure EGR valve is fully open, or by fully closing the high-pressure EGR valve. This increases the amount of exhaust gas that flows through the area of the exhaust passage downstream of the high-pressure EGR passage. Thus, a decrease in the boost pressure is suppressed by increasing the amount of exhaust gas that passes through the turbine.

Because the temperature of the high-pressure EGR passage is high, the temperature of EGR gas in the high-pressure EGR passage decreases to a small degree. Thus, if the EGR gas flows through the high-pressure EGR passage when the vehicle is decelerating or when the fuel supply to the internal combustion engine is cut off, high-temperature EGR gas is supplied to the cylinder when the vehicle accelerates. As a result, soot may be discharged when the vehicle is accelerating. According to the invention, however, low-temperature EGR gas, which has passed through the turbine and the like, flows through the low-pressure EGR passage. Therefore, because EGR gas that has passed through the low-pressure EGR passage is supplied into the cylinder when the vehicle starts accelerating, soot is hardly generated. Thus, because the deceleration-EGR means directs the EGR gas to flow through the low-pressure EGR passage by controlling the opening degree of the high-pressure EGR valve, the generation of soot is suppressed when the vehicle starts accelerating.

When the EGR gas flows through the high-pressure EGR passage, the amount of exhaust gas that flows through the area of the exhaust passage downstream of the high-pressure EGR passage decreases. Accordingly, the amount of EGR gas that flows through the low-pressure EGR passage also decreases. Thus, according to the invention, when the vehicle is decelerating or when the fuel supply to the internal combustion engine is cut off, the flow of exhaust gas into the high-pressure EGR gas passage is suppressed while the EGR gas flows through the low-pressure EGR passage. This suppresses the decrease in the amount of EGR gas that flows through the low-pressure EGR passage. Therefore, the generation of soot is suppressed when the vehicle is accelerating.

Thus, because the deceleration-EGR means closes the high-pressure EGR valve when the vehicle is decelerating or when the fuel supply to the internal combustion engine is cut off, the decrease in the boost pressure and the generation of soot are suppressed when the vehicle is accelerating.

The exhaust gas recirculation apparatus according to the above-described aspect may further include, air-fuel ratio storage means, and air-fuel ratio adjusting means. The air-fuel ratio storage means stores the air-fuel ratio immediately before the vehicle starts decelerating or the air-fuel ratio immediately before the fuel supply to the internal combustion engine is cut off. The air-fuel ratio adjusting means adjusts the actual air-fuel ratio toward a target air-fuel ratio by adjusting the opening degree of the high-pressure EGR valve based on the air-fuel ratio stored by the air-fuel ratio storage means.

In the above-described aspect, the air-fuel ratio adjusting means may cause burned gas to flow through the high-pressure EGR passage by adjusting the opening degree of the high-pressure EGR valve after fuel injection starts. The exhaust gas recirculation apparatus may further include a second intake throttle valve that adjusts the amount of intake air that flows through the area of the intake passage downstream of the compressor. The air-fuel ratio adjusting means may control the opening degree of the second intake throttle valve based on the stored air-fuel ratio. After fuel injection starts, the air-fuel ratio adjusting means may decrease the opening degree of the second intake throttle valve.

When the vehicle starts accelerating after the vehicle has decelerated or the fuel supply to the internal combustion engine has been cut off, the generation of NOx is suppressed by quickly making an actual EGR rate equal to a target EGR rate. However, when the vehicle is decelerating or when the fuel supply to the internal combustion engine is cut off, the air-fuel ratio of the EGR gas that is recirculated through the low-pressure EGR passage gradually increases due to the inflow of air. Accordingly, when the vehicle starts accelerating, although the EGR gas is supplied into the cylinder, the actual air-fuel ratio may not be quickly adjusted to a desired air-fuel ratio.

In the above-described aspect, the position where the high-pressure EGR passage connects to the exhaust passage is upstream of the position where the low-pressure EGR passage connects to the exhaust passage. That is, when the vehicle starts accelerating, the burned gas reaches the high-pressure EGR passage before reaching the low-pressure EGR passage. Therefore, after the vehicle starts accelerating, the burned gas can be supplied into the cylinder more quickly through the high-pressure passage than through the low-pressure passage. Further, the air-fuel ratio adjusting means adjusts the actual air-fuel ratio toward the target air-fuel ratio by adjusting the amount of EGR gas. Therefore, when the vehicle starts accelerating, the air-fuel ratio is quickly adjusted to an appropriate air-fuel ratio. This suppresses the generation of soot and NOx.

In the above-described aspect, the opening degree of the second intake throttle valve is decreased after fuel injection starts. Therefore, the pressure in the area of the intake pipe downstream of the second intake throttle valve is decreased. This promotes the flow of the EGR gas through the high-pressure EGR passage.

A second aspect of the invention relates to a method of controlling an exhaust gas recirculation apparatus for an internal combustion engine. The exhaust gas recirculation apparatus includes a variable-geometry turbocharger and a low-pressure EGR passage. The variable-geometry turbocharger includes a turbine provided in an exhaust passage, and a compressor provided in an intake passage. In the variable-geometry turbocharger, the cross sectional area of a path through which exhaust gas passes is adjusted by adjusting the opening degree of a nozzle vane. The low-pressure EGR passage connects an area of the exhaust passage downstream of the turbine to an area of the intake passage upstream of the compressor. EGR gas, which is part of exhaust gas discharged from an internal combustion engine, is recirculated to the intake passage through the low-pressure EGR passage. The method includes directing the EGR gas to flow through the low-pressure EGR passage when the vehicle is decelerating or when fuel supply to the internal combustion engine is cut off, and adjusting a pressure in the intake passage toward a target pressure by adjusting the opening degree of the nozzle vane when the EGR gas is directed to flow through the low-pressure EGR passage.

The exhaust gas recirculation apparatus for internal combustion engine and the method of controlling the exhaust gas recirculation apparatus according to the invention enable a vehicle to quickly accelerate while suppressing the discharge of NOx when the vehicle starts accelerating after the vehicle has decelerated or the fuel supply to the engine has been cut off.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIG. 3 is a flowchart showing the flow of a control that is executed according to the embodiment shown in FIG. 1 when a vehicle is decelerating or when fuel supply to the engine is cut off.

DETAILED DESCRIPTION OF THE EXAMPLE EMBODIMENTS

Hereinafter, an exhaust gas recirculation apparatus for an internal combustion engine according to an embodiment of the invention will be described with reference to the drawings.

Figure 1:
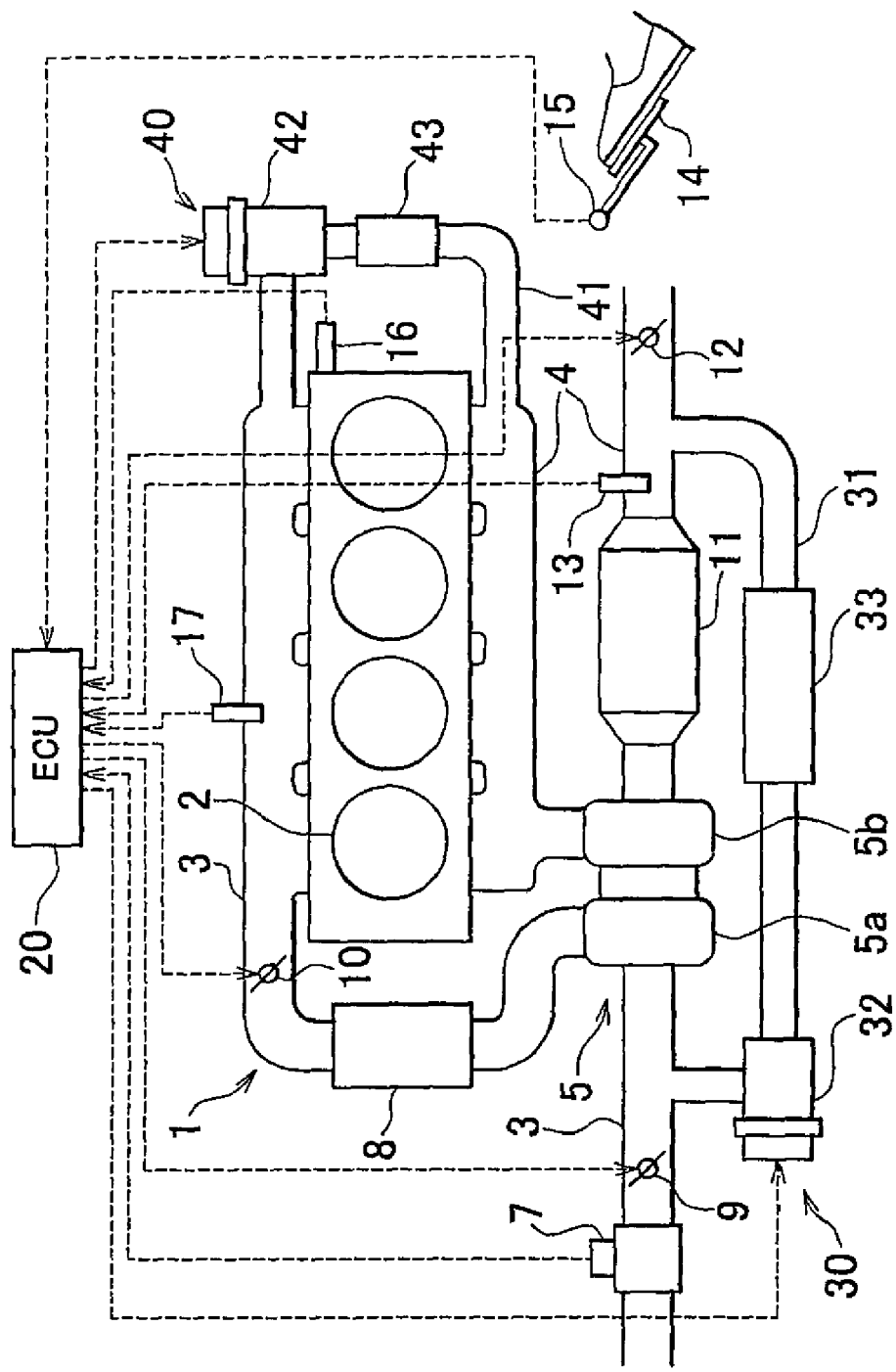
FIG. 1 is a schematic diagram showing the configuration of an internal combustion engine and intake/exhaust systems for the engine, in which an exhaust gas recirculation apparatus according to an embodiment of the invention is employed.

The internal combustion engine 1 in FIG. 1 is a water-cooled four-cycle diesel engine that includes four cylinders 2.

An intake pipe 3 and an exhaust pipe 4 connect to the internal combustion engine (hereinafter, simply referred to as "engine") 1. The compressor housing 5a of a turbocharger 5 is provided in the intake pipe 3. The turbocharger 5 is driven by the energy of exhaust gas. An airflow meter 7 is provided upstream of the compressor housing 5a in the intake pipe 3. The airflow meter 7 outputs a signal that indicates the flow rate of intake air flowing in the intake pipe. The amount of air taken into the engine 1 is measured using this airflow meter 7.

An intercooler 8 is provided downstream of the compressor housing 5a in the intake pipe 3. In the intercooler 8, heat is exchanged between the intake air and atmospheric air. A first intake throttle valve 9 is provided downstream of the airflow meter 7 and upstream of the compressor housing 5a in the intake pipe 3. The first intake throttle valve 9 adjusts the flow rate of intake air flowing in the intake pipe 3. An electric actuator operates the first intake throttle valve 9. Further, a second intake throttle valve 10 is provided downstream of the intercooler 8 in the intake pipe 3. The second intake throttle valve 10 adjusts the flow rate of intake air that flows in the intake pipe 3. An electric actuator operates the second intake throttle valve 10.

The turbine housing 5b of the turbocharger 5 is provided in the exhaust pipe 4. A particulate filter (hereinafter, simply referred to as "filter") 11 is provided downstream of the turbine housing 5b in the exhaust pipe 4. The filter 11 supports a NOx catalyst.

Figure 2B:
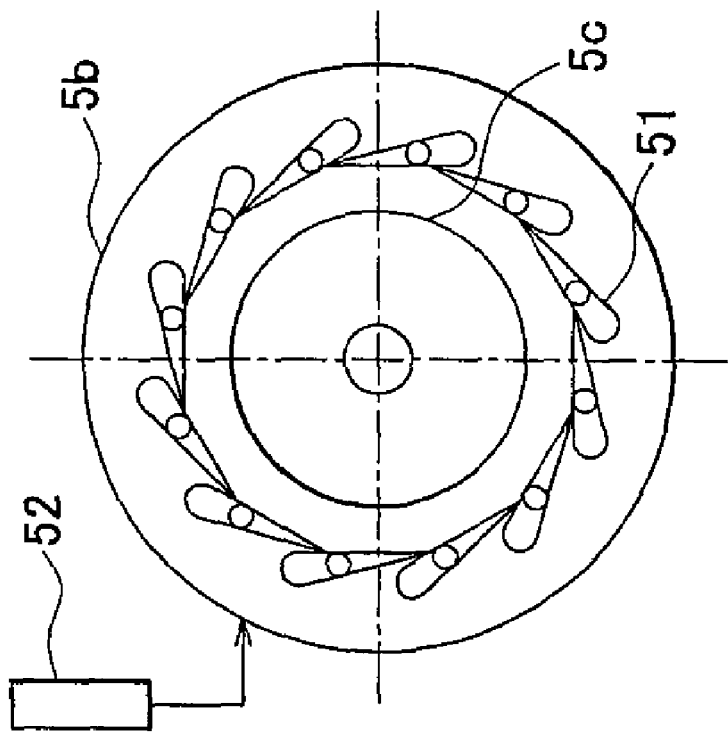
FIGS. 2A and 2B are schematic diagrams showing a variable-geometry turbocharger.
Figure 2A:
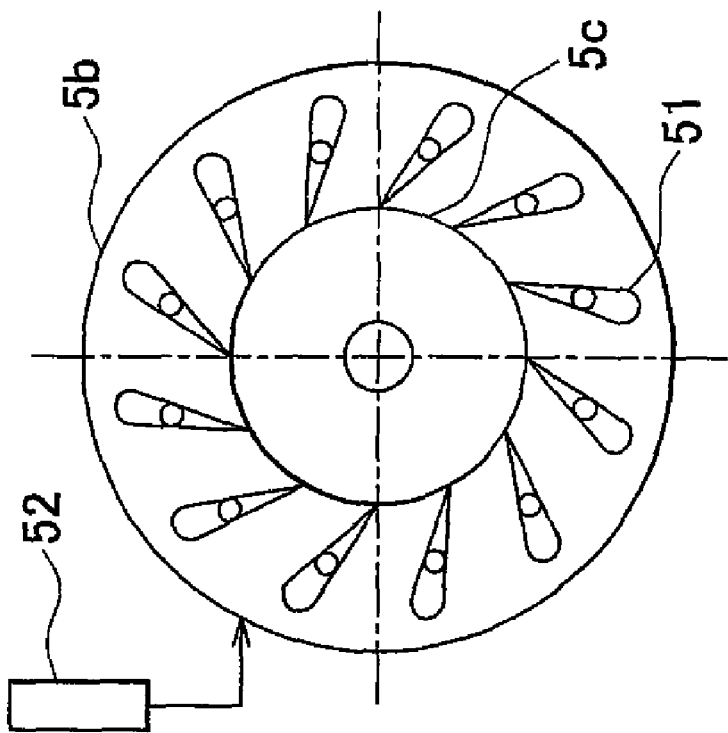

In this embodiment, the turbocharger 5 is a variable-geometry turbocharger. FIG. 2A shows the case where nozzle vanes 51 are open. FIG. 2B shows the case where the nozzle vanes 51 are closed.

As shown in FIGS. 2A and 2B, the variable-geometry turbocharger 5 is configured such that a plurality of nozzle vanes 51 is provided around an exhaust turbine 5c in the turbine housing 5b. An actuator 52 operates the nozzle vanes 51. When the actuator 52 turns the nozzle vanes 51 to decrease the opening degree of the nozzle vanes 51, the spaces (i.e., paths) between the adjacent nozzle vanes 51 decrease, and then the paths are closed. When the actuator 52 turns the nozzle vanes 51 to increase the opening degree of the nozzle vanes 51, the spaces (i.e., paths) between the adjacent nozzle vanes 51 increase, and then the paths are opened.

In the variable-geometry turbocharger with the above-described configuration, the actuator 52 controls the direction in which the nozzle vanes 51 turn, and the amount by which the nozzle vanes 51 turn, thereby adjusting the direction of the paths between the adjacent nozzle vanes 51 and the width of the paths. That is, the actuator 52 controls the direction in which the nozzle vanes 51 turn, and the amount by which the nozzle vanes 51 turn, thereby adjusting the direction, flow speed, and amount of exhaust gas that flows to the exhaust turbine 5c. Hereinafter, the opening degree of the nozzle vanes 51 will be referred to as "VN opening degree".

An exhaust throttle valve 12 is provided downstream of the filter 11 in the exhaust pipe 4. The exhaust throttle valve 12 adjusts the flow rate of exhaust gas that flows through the exhaust pipe 4. An electric actuator operates the exhaust throttle valve 12.

The engine 1 is provided with a low-pressure EGR device 30 that returns part of the exhaust gas from the exhaust pipe 4 to the intake pipe 3 under low pressure. The low-pressure EGR device 30 includes a low-pressure EGR passage 31, a low-pressure EGR valve 32, and a low-pressure EGR cooler 33.

The low-pressure EGR passage 31 connects the area of the exhaust pipe 4 downstream of the filter 11 and upstream of the exhaust throttle valve 12, to the area of the intake pipe 3 upstream of the compressor housing 5 and downstream of the first intake throttle valve 9. The exhaust gas is recirculated through the low-pressure EGR passage 31 under low pressure. In this embodiment, the exhaust gas that is recirculated through the low-pressure EGR passage 31 is referred to as "low-pressure EGR gas". The low-pressure EGR valve 32 adjusts the cross sectional area of the low-pressure EGR passage 31, thereby adjusting the amount of low-pressure EGR gas that flows through the low-pressure EGR passage 31. In the low-pressure EGR cooler 33, heat is exchanged between the low-pressure EGR gas that passes through the low-pressure EGR cooler 33 and coolant for the engine 1. Thus, the low-pressure EGR cooler 33 decreases the temperature of the low-pressure EGR gas.

The engine 1 is also provided with a high-pressure EGR device 40 that returns part of the exhaust gas from the exhaust pipe 4 to the intake pipe 3. The high-pressure EGR device 40 includes a high-pressure EGR passage 41, a high-pressure EGR valve 42, and a high-pressure EGR cooler 43.

The high-pressure EGR passage 41 connects the area of the exhaust pipe 4 upstream of the turbine housing 5b to the area of the intake pipe 3 downstream of the compressor housing 5a. The exhaust gas is recirculated through the high-pressure EGR passage 41 under high pressure. In this embodiment, the exhaust gas that is recirculated through the high-pressure EGR passage 41 is referred to as "high-pressure EGR gas". The high-pressure EGR valve 42 adjusts the cross sectional area of the high-pressure EGR passage 41, thereby adjusting the amount of high-pressure EGR gas that flows through the high-pressure EGR passage 41. In the high-pressure EGR cooler 43, heat is transferred from the high-pressure EGR gas that passes through the high-pressure EGR cooler 43 to the coolant for the engine 1. Thus, the high-pressure EGR cooler 43 reduces the temperature of the high-pressure EGR gas.

An air-fuel ratio sensor 13 is provided in the area of the exhaust pipe 4 downstream of the filter 11 and upstream of the position where the low-pressure EGR passage 31 connects to the exhaust pipe 4. The air-fuel ratio sensor 13 measures the air-fuel ratio of the exhaust gas in the exhaust pipe 4. An intake-air pressure sensor 17 is provided downstream of the second intake throttle valve 10 in the intake pipe 3. The intake-air pressure sensor 17 measures the pressure in the intake pipe 3.

An electronic control unit (hereinafter, referred to as ECU) 20 is provided to control the engine 1. More specifically, the ECU 20 controls the operating state of the engine 1 according to the condition under which the engine 1 operates, and the actions of the driver.

The ECU 20 is connected to the above-described airflow meter 7, air-fuel ratio sensor 13, and intake-air pressure sensor 17. In addition, the ECU 20 is connected to an accelerator-pedal operation amount sensor 15 and a crank position sensor 16 via electric wires. The accelerator-pedal operation amount sensor 15 outputs a signal that indicates the amount by which the accelerator pedal 14 is depressed. An engine load is determined based on the electric signal. The crank position sensor 16 detects the engine speed.

The ECU 20 is also connected to the actuators for the first intake throttle valve 9, second intake throttle valve 10, exhaust throttle valve 12, low-pressure EGR valve 32, high-pressure EGR valve 42, and nozzle vanes 51 via electric wires. Thus, the ECU 20 controls the valves and nozzle vanes.

In this embodiment, when the vehicle is decelerating or when the fuel supply to the engine 1 is cut off, the ECU 20 fully closes the exhaust throttle valve 12, fully opens the low-pressure EGR valve 32, and fully closes the high-pressure EGR valve 42.

When the vehicle is decelerating or when the fuel supply to the engine 1 is cut off, the air-fuel ratio of the gas in the cylinder 2, intake pipe 3, exhaust pipe 4, low-pressure EGR passage 31, and high-pressure EGR passage 41 is high. The ECU 20 controls the exhaust throttle valve 12, low-pressure EGR valve 32, and high-pressure EGR valve 42 according to the embodiment to suppress the increase in the air-fuel ratio of the gas in the above-described members.

When the vehicle is decelerating or when the fuel supply to the engine 1 is cut off, because the ECU 20 fully closes the exhaust throttle valve 12, the pressure is increased in the area of the exhaust pipe 4 upstream of the exhaust throttle valve 12. This increases the difference in the pressure between the area close to the exhaust pipe 4 and the area close to the intake pipe 3 in the low-pressure EGR passage 31. In addition, because the ECU 20 fully closes the high-pressure EGR valve 42, the exhaust gas in the exhaust pipe 4 does not flow into the high-pressure EGR passage 41. This further increases the pressure in the exhaust pipe 4. As a result, the low-pressure EGR gas flows through the low-pressure EGR passage 31.

Further, because the ECU 20 fully closes the exhaust throttle valve 12, the flow of burned gas into the area downstream of the exhaust throttle valve 12 is suppressed. That is, when the vehicle is decelerating or when the fuel supply to the engine 1 is cut off, the burned gas is repeatedly recirculated. As a result, the burned gas accumulates in the low-pressure EGR passage 31, cylinder 2, intake pipe 3, and exhaust pipe 4.

Further, the opening degree of the nozzle vanes 51 is controlled according to a boost pressure. More specifically, as the boost pressure decreases, the VN opening is decreased. When the vehicle is decelerating or when the fuel supply to the engine 1 is cut off, the boost pressure decreases due to a decrease in the engine speed or a decrease in the amount of intake air. However, the decrease in the boost pressure may be suppressed by decreasing the VN opening degree. In this embodiment, a feedback control is executed so that the actual boost pressure measured by the intake-air pressure sensor 17 is equal to a target value (hereinafter, will be sometimes referred to as "target boost pressure").

The exhaust throttle valve 12 may not be fully closed. That is, the opening degree of the exhaust throttle valve 12 may be smaller than that when the exhaust throttle valve 12 is fully open such that the EGR gas flows through the low-pressure EGR passage 31. The opening degree of the exhaust throttle valve 12 may be smaller than the opening degree immediately before the vehicle starts decelerating or immediately before the fuel supply to the engine 1 is cut off. Likewise, the low-pressure EGR valve 32 may not be fully opened. That is, the opening degree of the low-pressure EGR valve 32 may be greater than that when the low-pressure EGR valve 32 is fully closed. The opening degree of the low-pressure EGR valve 32 may be greater than the opening degree immediately before the vehicle starts decelerating or immediately before the fuel supply to the engine 1 is cut off. The high-pressure EGR valve 42 may not be fully closed. That is, the opening degree of the high-pressure EGR valve 42 may be smaller than that when the high-pressure EGR valve 42 is fully open. The opening degree of the high-pressure EGR valve 42 may be smaller than the opening degree immediately before the vehicle starts decelerating or immediately before the fuel supply to the engine 1 is cut off. Thus, it is possible to increase the difference in the pressure between the area close to the exhaust pipe 4 and the area close to the intake pipe 3 in the low-pressure EGR passage 31.

Next, the flow of the control that is executed according to the embodiment when the vehicle is decelerating or when the fuel supply is cut off will be described. FIG. 3 is a flowchart showing the flow of the control that is executed according to the embodiment when the vehicle is decelerating or when the fuel supply is cut off. This routine is repeatedly executed at predetermined intervals.

In step S101, it is determined whether at least one of deceleration and fuel supply cutoff is performed. That is, it is determined whether the low-pressure EGR gas needs to be repeatedly recirculated. For example, when both of the engine speed and the engine load decrease, it is determined that the vehicle is decelerating. Also, for example, when the speed of the engine 1 is equal to or above a prescribed engine speed, and the accelerator pedal is not depressed, it is determined that the fuel supply to the engine 1 is cut off. The prescribed engine speed is higher than an idling speed of the engine 1.

When an affirmative determination is made (that is, when it is determined that at least one of deceleration and fuel supply cutoff is performed) in step S101, the routine proceeds to step S102. When a negative determination is made (that is, when it is determined that the vehicle is not decelerating and the fuel supply to the engine 1 is not cut off) in step S101, the routine proceeds to step S103.

In step S102, the low-pressure EGR valve 32 is fully opened, and the high-pressure EGR valve 42 is fully closed. This promotes the flow of the low-pressure EGR gas.

In step S103, the air-fuel ratio is stored. The air-fuel ratio sensor 13 detects the air-fuel ratio. That is, when the vehicle is not decelerating and the fuel supply to the engine 1 is not cut off, the stored air-fuel ratio is updated. In this embodiment, the ECU 20 that performs the process in step S103 functions as the air-fuel ratio storage means (portion).

In step S104, the exhaust throttle valve 12 is fully closed. Even when the exhaust throttle valve 12 is closed as much as possible, there may be a space between the exhaust throttle valve 12 and the exhaust pipe 4, and the exhaust gas may pass through the space. In this case, when the exhaust throttle valve 12 is closed as much as possible, the exhaust throttle valve 12 may be regarded as being fully closed.

The process in step S104 increases the difference in the pressure between the area close to the exhaust pipe 4 and the area close to the intake pipe 3 in the low-pressure EGR passage 31. As a result, a great amount of low-pressure EGR gas flows through the low-pressure EGR passage 31. In this embodiment, the ECU 20 that performs the processes in steps S102 and S104 functions as the deceleration-EGR means (portion) according to the invention.

In step S105, the opening degree of the nozzle vanes 51 is controlled through feedback. That is, the VN opening is controlled so that the actual boost pressure detected by the intake-air pressure sensor 17 is equal to the target boost pressure. For example, the target boost pressure is empirically determined and set in advance such that the vehicle quickly accelerates when the accelerator pedal 14 is depressed. In this embodiment, the ECU 20 that performs the process in step S105 functions as the deceleration-supercharging means (portion) according to the invention.

In step S106, it is determined whether the vehicle is accelerating after the vehicle has decelerated or the fuel supply to the engine 1 has been cut off. That is, it is determined whether the low-pressure EGR gas should continue to be recirculated, or a control for accelerating the vehicle should start.

When an affirmative determination is made in step S106, the routine proceeds to step S107. When a negative determination is made in step S106, the routine returns to step S105.

In step S107, fuel injection starts. Accordingly, burned gas is discharged from the cylinder. At the same time, the exhaust throttle valve 12 is opened. At this time, the exhaust throttle valve 12 may be fully opened. Alternatively, the opening degree of the exhaust throttle valve 12 may be set according to the operating state of the engine 1.

In step S108, the opening degree of the high-pressure EGR valve 42 is controlled through feedback. That is, the opening degree of the high-pressure EGR valve 42 is controlled so that the actual air-fuel ratio (i.e., the air-fuel ratio of the gas that flows into the cylinder 2) is equal to a target air-fuel ratio. The actual air-fuel ratio is determined based on the air-fuel ratio detected by the air-fuel ratio sensor 13, and the amount of intake air detected by the airflow meter 7. The target air-fuel ratio is set to the air-fuel ratio detected immediately before the vehicle starts decelerating, or immediately before the fuel supply is cut off. That is, the target air-fuel ratio is set to the air-fuel ratio stored in step S103. A sensor may directly measure the actual air-fuel ratio of the gas that flows into the cylinder 2.

When the low-pressure EGR gas is recirculated through the low-pressure EGR passage 31, air may pass through the first intake throttle valve 9 and the second intake throttle valve 10. In this case, the air-fuel ratio of the low-pressure EGR gas gradually increases. However, because the burned gas, which is newly generated in the cylinder 2 after the fuel injection starts, is recirculated through the high-pressure EGR passage 41, the air-fuel ratio of the gas in the cylinder 2 can be quickly decreased. In this embodiment, the ECU 20 that performs the process in step S108 functions as the air-fuel ratio adjusting means (portion) according to the invention.

In step S108, the opening degree of the second intake throttle valve 10 may be controlled, in addition to the opening degree of the high-pressure EGR valve 42. In this case, by decreasing the opening degree of the second intake throttle valve 10, the pressure is decreased in the area of the intake pipe 3 downstream of the second intake throttle valve 10. This promotes the flow of the high-pressure EGR gas.

The target air-fuel ratio may be determined based on the current operating state of the engine 1 (for example, based on the engine speed and engine load).

In step S109, it is determined whether the actual air-fuel ratio is equal to the target air-fuel ratio.

When an affirmative determination is made in step S109, the routine proceeds to step S110. When a negative determination is made in step S109, the routine returns to step S108.

In step S110, the low-pressure EGR valve 32, high-pressure EGR valve 42, first intake throttle valve 9, second intake throttle valve 10, exhaust throttle valve 12, and nozzle vanes 51 are normally controlled. For example, they are controlled based on the engine speed, engine load, and the like.

Thus, when the vehicle is decelerating or when the fuel supply to the engine 1 is cut off, the low-pressure EGR gas flows through the low-pressure EGR passage 31. Therefore, the exhaust gas, which is produced immediately before the vehicle starts decelerating or immediately before the fuel supply to the engine 1 is cut off, remains in the intake pipe 3, exhaust pipe 4, and low-pressure EGR passage 31. When the vehicle starts accelerating after the vehicle has decelerated or the fuel supply to the engine 1 has been cut off, the remaining exhaust gas is supplied into the cylinder 2. Therefore, the actual air-fuel ratio may be quickly adjusted to the target air fuel ratio. Further, the amount of NOx is reduced by the EGR gas when the vehicle starts accelerating. In addition, because the temperature of the low-pressure EGR gas is low, the generation of soot is suppressed when the vehicle is accelerating.

Further, when the vehicle is decelerating or when the fuel supply to the engine 1 is cut off, by suppressing the amount of gas that flows through the high-pressure EGR passage 41, the amount of low-pressure EGR gas that flows through the low-pressure EGR passage 31 is increased, and accordingly, the amount of gas that passes through the turbine housing 5b is increased. This suppresses the decrease in the boost pressure. Further, by adjusting the opening degree of the nozzle vanes 51, the decrease in the boost pressure is more effectively suppressed.

When the vehicle starts accelerating, because the high-pressure EGR gas flows through the high-pressure EGR passage 41, the actual air-fuel ratio is quickly decreased.

In this embodiment, when the low-pressure EGR gas flows through the low-pressure EGR passage 31, the exhaust throttle valve 12 is closed. Instead of, or in addition to closing the exhaust throttle valve 12, the first intake throttle valve 9 may be closed. That is, in step S104, the first intake throttle valve 9 may be closed, instead of the exhaust throttle valve 12. Alternatively, both of the exhaust throttle valve 12 and the first intake throttle valve 9 may be closed. By closing the first intake throttle valve 9, it is possible to increase the difference in the pressure between the upstream area and the downstream area in the low-pressure EGR passage 31. As a result, the low-pressure EGR gas flows through the low-pressure EGR passage 31. The condition for closing the first intake throttle valve 9 is the same as the condition for closing the exhaust throttle valve 12.

When only the first intake throttle valve 9 is closed, the exhaust throttle valve 12 does not need to be provided. The exhaust throttle valve 12 may be provided in the area of the exhaust pipe 4 on the engine-side of (i.e., upstream of) the position where the low-pressure EGR passage 31 connects to the exhaust pipe 4. In this case as well, the pressure difference in the low-pressure EGR passage 31 can be increased. There is more flexibility in selecting the location where the exhaust throttle valve 12 may be provided.

Further, when only the exhaust throttle valve 12 is closed, the first intake throttle valve 9 does not need to be provided. The first intake throttle valve 9 may be provided in the area of the intake pipe 3 on the engine-side of (downstream of) the position where the low-pressure EGR passage 31 connects to the intake pipe 3. In this case as well, the pressure difference in the low-pressure EGR passage 31 may be increased. There is more flexibility in selecting the location where the first intake valve 9 may be provided.

The invention claimed is:

1. A method of controlling an exhaust gas recirculation apparatus for an internal combustion engine, which includes a variable-geometry turbocharger that includes a turbine provided in an exhaust passage, and a compressor provided in an intake passage, wherein a cross sectional area of a path through which exhaust gas passes is adjusted by adjusting an opening degree of a nozzle vane; an electronic controller and a low-pressure EGR passage that connects an area of the exhaust passage downstream of the turbine to an area of the intake passage upstream of the compressor, and through which EGR gas, which is part of exhaust gas discharged from an internal combustion engine, is recirculated to the intake passage, the method comprising:

directing the EGR gas to flow through the low-pressure EGR passage when at least one of a vehicle is decelerating and fuel supply to the internal combustion engine is cut off; and adjusting a pressure in the intake passage toward a target pressure by adjusting the opening degree of the nozzle vane when the EGR gas is directed to flow through the low-pressure EGR passage.

2. The method of controlling the exhaust gas recirculation apparatus according to claim 1, further comprising:

directing the EGR gas to flow through the low-pressure EGR passage by making an opening degree of a low-pressure EGR valve greater than that when the low-pressure EGR valve is fully closed, and making an opening degree of an exhaust throttle valve smaller than that when the exhaust throttle valve is fully open, wherein the low-pressure EGR valve adjusts an amount of EGR gas that flows through the low-pressure EGR passage, and the exhaust throttle valve adjusts an amount of exhaust gas that flows through an area of the exhaust passage downstream of where the low-pressure EGR passage is connected to the exhaust passage.

3. The method of controlling the exhaust gas recirculation apparatus according to claim 1, further comprising:

directing the EGR gas to flow through the low-pressure EGR passage by making an opening degree of a low-pressure EGR valve greater than that when the low-pressure EGR valve is fully closed, and making an opening degree of a first intake throttle valve smaller than that when the first intake throttle valve is fully open, wherein the low-pressure EGR valve adjusts an amount of EGR gas that flows through the low-pressure EGR passage; and the first intake throttle valve adjusts an amount of intake air that flows through an area of the intake passage upstream of where the low-pressure EGR passage is connected to the intake passage.

4. The method of controlling the exhaust gas recirculation apparatus according to claim 1, further comprising:

making an opening degree of a high-pressure EGR valve smaller than that when the high-pressure EGR valve is fully open, when the vehicle is decelerating or when the fuel supply to the internal combustion engine is cut off, wherein the high-pressure EGR valve adjusts an amount of EGR gas that flows through a high-pressure EGR passage; and the high-pressure EGR passage connects an area of the exhaust passage upstream of the turbine to an area of the intake passage downstream of the compressor, and the EGR gas is recirculated to the intake passage through the high-pressure EGR passage.

5. The method of controlling the exhaust gas recirculation apparatus according to claim 4, further comprising:

storing an air-fuel ratio immediately before the vehicle starts decelerating or immediately before the fuel supply to the internal combustion engine is cut off; and adjusting an actual air-fuel ratio toward a target air-fuel ratio by adjusting the opening degree of the high-pressure EGR valve based on the stored air-fuel.

6. An exhaust gas recirculation apparatus for an internal combustion, comprising:

a variable-geometry turbocharger that includes a turbine provided in an exhaust passage, and a compressor provided in an intake passage, wherein a cross sectional area of a path through which exhaust gas passes is adjusted by adjusting an opening degree of a nozzle vane;

a low-pressure EGR passage that connects an area of the exhaust passage downstream of the turbine to an area of the intake passage upstream of the compressor, and through which EGR gas, which is part of exhaust gas discharged from an internal combustion engine, is recirculated to the intake passage;

a deceleration-EGR controlling portion that receives an engine operating condition and a fuel cut-off condition and that directs the EGR gas to flow through the low-pressure EGR passage when the vehicle is decelerating or when fuel supply to the internal combustion engine is cut off; and a deceleration-supercharging controlling portion that adjusts a pressure in the intake passage toward a target pressure by adjusting the opening degree of the nozzle vane when the EGR gas flows through the low-pressure EGR passage by being controlled by the deceleration-EGR portion and at least one of the vehicle decelerating and the fuel supply being cut off.

7. The exhaust gas recirculation apparatus according to claim 6, wherein when the deceleration-EGR controlling portion directs the EGR gas to flow through the low-pressure EGR passage, the deceleration-supercharging controlling portion decreases the opening degree of the nozzle vane.

8. The exhaust gas recirculation apparatus according to claim 6, further comprising:

a low-pressure EGR valve that adjusts an amount of EGR gas that flows through the low-pressure EGR passage; and an exhaust throttle valve that adjusts an amount of exhaust gas that flows through an area of the exhaust passage downstream of where the low-pressure EGR passage is connected to the exhaust passage, wherein the deceleration-EGR controlling portion directs the EGR gas to flow through the low-pressure EGR passage by making an opening degree of the low-pressure EGR valve greater than that when the low-pressure EGR valve is fully closed, and making an opening degree of the exhaust throttle valve smaller than that when the exhaust throttle valve is fully open.

9. The exhaust gas recirculation apparatus according to claim 8, wherein the deceleration-EGR controlling portion fully opens the low-pressure EGR valve and fully closes the exhaust throttle valve when the vehicle is decelerating or when the fuel supply to the internal combustion engine is cut off.

10. The exhaust gas recirculation apparatus according to claim 6, further comprising:

a low-pressure EGR valve that adjusts an amount of EGR gas that flows through the low-pressure EGR passage; and a first intake throttle valve that adjusts an amount of intake air that flows through an area of the intake passage upstream of where the low-pressure EGR passage is connected to the intake passage, wherein the deceleration-EGR controlling portion directs the EGR gas to flow through the low-pressure EGR passage by making an opening degree of the low-pressure EGR valve greater than that when the low-pressure EGR valve is fully closed, and making an opening degree of the first intake throttle valve smaller than that when the first intake throttle valve is fully open.

11. The exhaust gas recirculation apparatus according to claim 10, wherein the deceleration-EGR controlling portion fully opens the low-pressure EGR valve and fully closes the first intake throttle valve when the vehicle is decelerating or when the fuel supply to the internal combustion engine is cut off.

12. The exhaust gas recirculation apparatus according to claim 6, further comprising:

a low-pressure EGR valve that adjusts an amount of EGR gas that flows through the low-pressure EGR passage;

an exhaust throttle valve that adjusts an amount of exhaust gas that flows through an area of the exhaust passage downstream of where the low-pressure EGR passage is connected to the exhaust passage; and a first intake throttle valve that adjusts an amount of intake air that flows through an area of the intake passage upstream of where the low-pressure EGR passage is connected to the intake passage, wherein the deceleration-EGR controlling portion directs the EGR gas to flow through the low-pressure EGR passage by making an opening degree of the low-pressure EGR valve greater than that when the low-pressure EGR valve is fully closed, and making an opening degree of the exhaust throttle valve smaller than that when the exhaust throttle valve is fully open, and making an opening degree of the first intake throttle valve smaller than that when the first intake throttle valve is fully open.

13. The exhaust gas recirculation apparatus according to claim 12, wherein the deceleration-EGR controlling portion fully opens the low-pressure EGR valve, and fully closes the exhaust throttle valve and the first intake throttle valve when the vehicle is decelerating or when the fuel supply to the internal combustion engine is cut off.

14. The exhaust gas recirculation apparatus according to claim 6, further comprising:
  a high-pressure EGR passage that connects an area of the exhaust passage upstream of the turbine to an area of the intake passage downstream of the compressor, and through which the EGR gas is recirculated to the intake passage; and
  a high-pressure EGR valve that adjusts an amount of EGR gas that flows through the high-pressure EGR passage, wherein the deceleration-EGR controlling portion makes an opening degree of the high-pressure EGR valve smaller than that when the high-pressure EGR valve is fully open.

15. The exhaust gas recirculation apparatus according to claim 14, wherein the deceleration-EGR controlling portion fully closes the high-pressure EGR valve when the vehicle is decelerating or when the fuel supply to the internal combustion engine is cut off.

16. The exhaust gas recirculation apparatus according to claim 14, further comprising:
  an air-fuel ratio storage portion that stores an air-fuel ratio immediately before the vehicle starts decelerating or immediately before the fuel supply to the internal combustion engine is cut off; and
  an air-fuel ratio controlling portion that adjusts an actual air-fuel ratio toward a target air-fuel ratio by adjusting the opening degree of the high-pressure EGR valve based on the air-fuel ratio stored by the air-fuel ratio storage portion.

17. The exhaust gas recirculation apparatus according to claim 16, wherein the air-fuel ratio controlling portion causes burned gas to flow through the high-pressure EGR passage by adjusting the opening degree of the high-pressure EGR valve after fuel injection starts.

18. The exhaust gas recirculation apparatus according to claim 16, further comprising:
  a second intake throttle valve that adjusts an amount of intake air that flows through an area of the intake passage downstream of the compressor, wherein the air-fuel ratio controlling portion controls an opening degree of the second intake throttle valve based on the stored air-fuel ratio.

19. The exhaust gas recirculation apparatus according to claim 18, wherein the air-fuel ratio controlling portion decreases the opening degree of the second intake throttle valve after fuel injection starts.

20. The exhaust gas recirculation apparatus according to claim 6, further comprising:
  a high-pressure EGR passage that connects an area of the exhaust passage upstream of the turbine to an area of the intake passage downstream of the compressor, and through which the EGR gas is recirculated to the intake passage;
  a high-pressure EGR valve that adjusts an amount of EGR gas that flows through the high-pressure EGR passage;
  an air-fuel ratio storage portion that stores an air-fuel ratio immediately before the vehicle starts decelerating or immediately before the fuel supply to the internal combustion engine is cut off; and
  an air-fuel ratio controlling portion that adjusts an actual air-fuel ratio toward a target air-fuel ratio by adjusting an opening degree of the high-pressure EGR valve based on the air-fuel ratio stored by the air-fuel ratio storage portion.

21. The exhaust gas recirculation apparatus according to claim 20, wherein the air-fuel ratio controlling portion causes burned gas to flow through the high-pressure EGR passage by adjusting the opening degree of the high-pressure EGR valve after fuel injection starts.

22. The exhaust gas recirculation apparatus according to claim 20, further comprising:
  a second intake throttle valve that adjusts an amount of intake air that flows through an area of the intake passage downstream of the compressor, wherein the air-fuel ratio controlling portion controls an opening degree of the second intake throttle valve based on the stored air-fuel ratio.

23. The exhaust gas recirculation apparatus according to claim 22, wherein the air-fuel ratio controlling portion decreases the opening degree of the second intake throttle valve after fuel injection starts.

* * * * *